(12) United States Patent
Jacobsen

(10) Patent No.: US 8,113,256 B2
(45) Date of Patent: Feb. 14, 2012

(54) MOVABLE INJECTION PASSAGES DURING THE MANUFACTURE OF LAMINATES

(75) Inventor: Torben Krogsdal Jacobsen, Lunderskov (DK)

(73) Assignee: LM Glasfiber A/S, Undershot (DK)

( * ) Notice: Subject to any disclaimer, the term of this patent is extended or adjusted under 35 U.S.C. 154(b) by 325 days.

(21) Appl. No.: 12/084,913

(22) PCT Filed: Nov. 14, 2006

(86) PCT No.: PCT/DK2006/000628
§ 371 (c)(1),
(2), (4) Date: Jul. 21, 2008

(87) PCT Pub. No.: WO2007/054101
PCT Pub. Date: May 18, 2007

(65) Prior Publication Data
US 2009/0114339 A1 May 7, 2009

(30) Foreign Application Priority Data
Nov. 14, 2005 (DK) .................................. 2005 01576

(51) Int. Cl.
*B29C 70/44* (2006.01)
(52) U.S. Cl. ..................... 156/382; 425/129.1; 425/389; 425/504
(58) Field of Classification Search .................. 4/255.05; 156/382; 425/129.1, 389, 504
See application file for complete search history.

(56) References Cited

U.S. PATENT DOCUMENTS

| | | | | |
|---|---|---|---|---|
| 978,852 A * | 12/1910 | Cunningham | ................. | 417/239 |
| 4,768,237 A * | 9/1988 | Torti | ............................. | 4/255.05 |
| 4,836,765 A * | 6/1989 | Kornitzky et al. | ............. | 425/388 |
| 5,194,105 A * | 3/1993 | Nguyen | ......................... | 156/293 |
| 5,328,656 A | 7/1994 | Thulin | | |
| 5,500,164 A * | 3/1996 | Livesay et al. | ................. | 264/459 |
| 5,664,284 A * | 9/1997 | Brzoska | ........................... | 15/330 |
| 5,885,513 A * | 3/1999 | Louderback et al. | .......... | 264/459 |
| 6,698,735 B2 * | 3/2004 | Zywno | .............................. | 269/21 |
| 7,000,284 B1 * | 2/2006 | Sowden et al. | .................. | 15/314 |
| 2002/0155186 A1 | 10/2002 | Walsh | | |
| 2004/0016452 A1 * | 1/2004 | Kunisawa et al. | ............. | 134/113 |

FOREIGN PATENT DOCUMENTS

| | | |
|---|---|---|
| DE | 199 26 896 | 12/2000 |
| EP | 0 348 831 | 1/1990 |
| EP | 1 038 656 | 9/2000 |
| WO | WO 2004/000536 | 6/2002 |
| WO | WO 2004/101259 | 5/2004 |
| WO | WO 2007/054097 | * 5/2007 |

* cited by examiner

*Primary Examiner* — Yogendra Gupta
*Assistant Examiner* — Jeremiah Smith
(74) *Attorney, Agent, or Firm* — The Nath Law Group; Jerald L. Meyer

(57) ABSTRACT

The present invention relates to a method of manufacturing a laminate with the formation of underpressure between a mold and a vacuum foil and supply of resin from injection areas to the layers of the laminate situated in the mold. The novel aspect according to the invention comprises movement of the injection areas while the resin is supplied. This is accomplished by use of a movable suction unit which is arranged on top of the vacuum foil and which, by means of an underpressure between the suction unit and the vacuum foil, forms injection areas for supply of the resin, which can be moved by moving the suction unit. The invention further relates to such movable suction unit and the use thereof in the manufacture of laminates.

5 Claims, 3 Drawing Sheets

MOVABLE INJECTION PASSAGES DURING THE MANUFACTURE OF LAMINATES

The invention relates to a method of manufacturing a laminate comprising the formation of an underpressure between a mould and a vacuum foil and supply of resin from injection areas to the layers of the laminate placed in the mould. The invention further relates to a unit for the supply and distribution of resin during the manufacture of laminates by the above-mentioned method.

BACKGROUND

The so-called VARTM-technique (Vacuum Assisted Resin Transfer Molding) is a method of manufacturing laminates wherein an underpressure is used for impregnating the various layers of the laminate with resin. The layers are arranged in a single-sided open mould part, on top of which a number of inlet passages are distributed and, at the top, a vacuum foil which is sealed along the edges of the mould part. Then a vacuum is applied in the mould cavity between the foil and the mould part, and the resin is infused or injected from the inlet passages. Following complete or partial hardening of the laminate, the foil is removed and optionally also the inlet passages, and the laminate can be discharged from the mould.

In order to ensure optimal properties of the finished laminate, it is important that all the layers in laminate are completely impregnated with resin and that there are no dry pockets. It is therefore important to distribute and arrange the inlet passages across large parts of the laminate surface in such a manner that the resin supply can be controlled and regulated optimally, which, however, often turns out to be difficult in practice. Simultaneously with ensuring a complete impregnation of all the layers, it is also desirable to be able to perform the injection as quickly as possible.

U.S. Pat. No. 5,328,656 teaches a method of performing vacuum infusion of large shell structures, wherein one or more inlet tubes are conveyed into a cavity in the laminate, following which the cavity is filled from below with a monomer and a hardener. During the filling procedure, the tube is gradually withdrawn to the effect that the outlet end of the tube is continuously just below the flow front. Hereby an even and complete injection into the mould cavity is ensured. However, it is not possible by the above-referenced VARTM-process to move the inlet passages around as they are kept in place by the underpressure and the pressure of the vacuum cloth.

Yet a problem which is associated with the VARTM-process is the large waste of resin involved in the method, since, following the injection, the resin-filled inlet passages either remain on the top face and then partake as a very resin-rich part of the laminate without contributing positively to the properties of the laminate or are removed from the laminate following hardening and must be discarded. By using collapsible inlet bags the passages can be emptied of resin by the pressure of the vacuum foil following finished injection, and the resin waste can thus be reduced. However, this solution presupposes that the vacuum foil is very elastic in order for the inlet passages to open and make room for the resin to enter.

WO 2004/000536 discloses a method of forming a system of temporary inlet passages, wherein a plate consisting of a number of interconnected spacers are arranged in a pattern on top of the vacuum cloth and is covered by one or two further vacuum foils. Hereby the lowermost foil can be sucked up between the spacers to the effect that inlet passages are formed between the material layers and the vacuum foil. However, the described system is complex in that several vacuum foils are used and, likewise, it is required to provide a plate or mat of spacers that specifically fits the shape of the laminate to be produced. Moreover, that method does not solve the problem either of ensuring complete impregnation of the laminate without dry pockets.

OBJECT AND DESCRIPTION OF THE INVENTION

It is the object of the invention to provide a method of vacuum injecting laminates with resin whereby the above-referenced problems of incomplete and deficient impregnation are avoided. It is a further object to reduce the resin waste from the resin filled inlet passages following ended injection.

Thus, the present invention relates to a movable suction unit for forming an injection area for resin during the manufacture of laminates, said suction unit being arranged on top of the vacuum foil. The suction unit comprises an upwardly arched underside and means for forming underpressure between the underside and the subjacent vacuum foil to the effect that the suction unit is movable during the manufacture.

Hereby the advantageous aspect is accomplished that the resin injection can be kept just at or right after the flow front of the resin, whereby the pressure gradient is increased markedly. This further entails that the injection can be performed more quickly and that, due to the increased pressure gradient, the injection becomes more efficient and complete. It is a further considerable advantage of the movable suction unit that the injection areas can be emptied substantially completely of resin, quite simply by interrupting the suction on the suction unit. Hereby the relatively large amounts of resin that are otherwise wasted in conventional inlet passages and bags are saved. Likewise, it is an option to continuously open and close the resin supply from various individual suction units as desired during the manufacturing process by controlling the suction on the suction unit. Hereby it is possible, in an extremely simple but efficient manner, to control and regulate the resin injection in local areas of the mould. By using one or more movable suction units according to the invention, the often complex and time-consuming laying of stationary injection passages is avoided, which is otherwise required to ensure complete injection. The movable suction units described herein are also advantageous in that they can be manufactured at low production costs and may furthermore be advantageous in that they can be reused for the manufacture of other laminates and they are, to a wide extent, independent of the shape of the laminate.

Moreover the invention relates to a movable suction unit according to the above, wherein the upwardly arched underside of the suction unit forms an elongate passage or an inverses dish. According to the former, the resin can be conveyed efficiently far in over the laminate and thus be injected across a large area. An inversed dish-shape is advantageous for injecting limited areas, e.g. for subsequent injection of dry pockets.

By a further embodiment of the invention, the means for forming underpressure on the movable suction unit is connected to at least one perforation in the upwardly arched underside. By sucking through a number of perforations in the underside of the suction unit, the vacuum foil can more easily and more reliably be sucked upwards to follow the entire underside. Hereby the suction necessary for lifting the vacuum foil is also minimised.

A further embodiment of the invention comprises at least one passage leading into at least a part of the abutting face of the suction unit against the subjacent vacuum foil, through which passage lubricants are supplied, whereby the friction against the vacuum foil is reduced during moving. Hereby a more easily movable suction unit is accomplished even in case a relatively large underpressure is applied onto the suction unit or onto the mould cavity.

According to yet an embodiment the movable suction unit comprises at least one passage leading into the upwardly arched underside for supply of resin. Hereby the resin can be supplied locally through the suction unit and a perforation in the vacuum foil, whereby the suction unit can be arranged anywhere on top of the laminate as needed.

The invention further relates to an embodiment, where the movable suction unit is manufactured at least partially in a flexible material, such as a soft plastic, rubber or the like. Thus, the suction unit can follow the surface of the laminate even in case of curved or even double-curved faces. The flexibility further entails that the suction unit can be produced as a standard unit and reused for the manufacture of laminates having different shapes. Likewise, it is possible to allow a flexible suction unit to follow a curving course across the laminate surface, whereby the injection area can, to an even greater extent, be moved to the place where it is desired or necessary.

The present invention also relates to a method of manufacturing a laminate comprising formation of an underpressure between a mould and a vacuum foil and supply of resin from injection areas to the layers of the laminate arranged in the mould, said method further comprising moving the injection areas during the supply. Moreover, one embodiment of the invention relates to a method of manufacturing a laminate according to the above, further comprising use of a movable suction unit according to the above. The advantages of this are as described above in the context of the movable suction unit.

According to yet an embodiment of the invention the above-described method further comprises to arrange the movable suction unit on top of the vacuum foil; to form an injection area underneath the suction unit by application of underpressure between the vacuum foil and the suction unit; to distribute resin from the injection areas; and to move the resin distribution by moving the suction unit.

Further, the invention relates to a method of manufacturing a laminate according to the above, wherein the underpressure between the vacuum foil and the suction unit is formed before the underpressure between the mould and the vacuum foil is formed. Hereby it is accomplished that the vacuum foil can be sucked into the suction end at an even moderate underpressure, since it does not have to also cancel out an underpressure in the mould cavity. Moreover, the injection area underneath the suction unit can hereby be formed independently of the elasticity of the vacuum foil.

According to yet an embodiment of the invention, the underpressure is formed between the vacuum foil and the suction unit after the formation of underpressure between the mould and the vacuum foil.

The invention further describes a method according to one or more parts of the above, wherein at least a part of the suction unit is moved during the resin supply in a direction at least partially in the wake of the flow front of the resin. Hereby a maximal pressure gradient is maintained during the injection, whereby the efficiency and speed thereof are increased.

A further embodiment of the invention relates to a method of manufacturing a laminate according to the above, wherein an end of the suction unit is moved along an edge of the mould. Hereby the resin can be supplied to the injection area underneath the suction unit from one or more intakes that can be arranged along the edge of the mould part in a simple and efficient manner.

Yet an embodiment of the invention relates to a method of manufacturing a laminate in accordance with the above, wherein at least a part of the suction unit is moved for subsequent injection of another part of the laminate. Hereby dry and incompletely impregnated areas in the laminate can be avoided if they are detected during the injection procedure.

A further embodiment of the invention relates to a method of manufacturing a laminate in accordance with the above, further comprising arrangement of a manifold with resin supply underneath the vacuum foil. Hereby resin supply to the injection areas formed by the movable suction units is ensured, without them necessarily extending to the edge of the mould.

By a further embodiment of the method according to the invention, resin is supplied from the suction unit through one or more holes in the vacuum foil, whereby the resin can be injected into any local area of the laminate without depending on whether a manifold or a tube with resin supply underneath the vacuum foil is situated near the suction unit.

Finally the present invention also relates to the use of a movable suction unit for resin supply in the manufacture of a laminate, said suction unit being described by the previously mentioned embodiments. The advantages of this are as described earlier for the manufacturing method and the movable suction unit.

BRIEF DESCRIPTION OF THE DRAWINGS

In the following the invention is described with reference to the figures, wherein.

DESCRIPTION OF EMBODIMENTS

Figure 1:
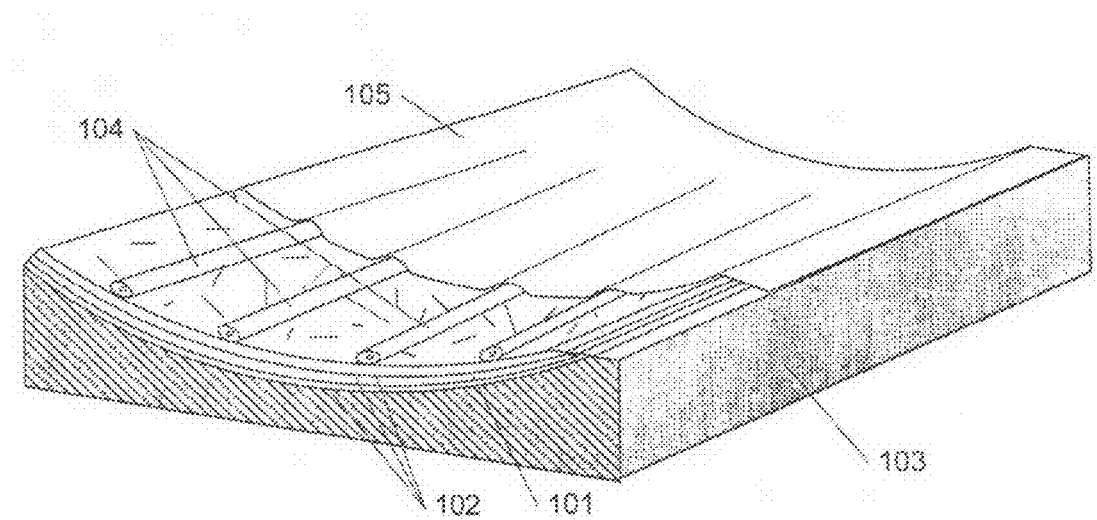
FIG. 1 shows the manufacture of a laminate by a conventional VARTM process.

FIG. 1 shows the manufacture of a laminate 101 by a so-called VARTM process (Vacuum Assisted Resin Transfer Moulding) according to the prior art. A number of layers 102 for the laminate are laid in a single-sided mould part 103. On top of this, inlet passages 104 are arranged from which the resin is distributed and infused or injected down and out through layers 102. The layers and inlet passages are covered by a vacuum cloth or foil 105 that can be secured in various ways around the edge of the mould (not shown) to the effect that the mould cavity between the vacuum foil and the mould part is sealed. Before the injection is started, vacuum is applied to the mould cavity. This can be accomplished in various ways, e.g. from the edge of the mould or via suction from the underside of the layers through holes in the mould part 103. Then the resin is distributed via the inlet passages and impregnates the layers 12 either exclusively by infusion due to the applied vacuum or by injection where the resin supply is also pressurised. Following moulding and complete or partial hardening of the laminate, the resin-filled inlet passages may either partake as a resin-rich part of the laminate and hence as a deadweight or be removed. The latter can be facilitated by arrangement of a tear-off layer with poor adhesion underneath the injection passages. The properties of the finished laminate greatly depend on all layers being impregnated all the way through with resin. To ensure this and to avoid pockets where the layers are not impregnated, the inlet passages 104 are usually distributed across the layers, to the effect that the resin distribution becomes as even and uniform as possible, and likewise to the effect that the injection can be performed as quickly as possible for the sake of process time.

Figure 2:
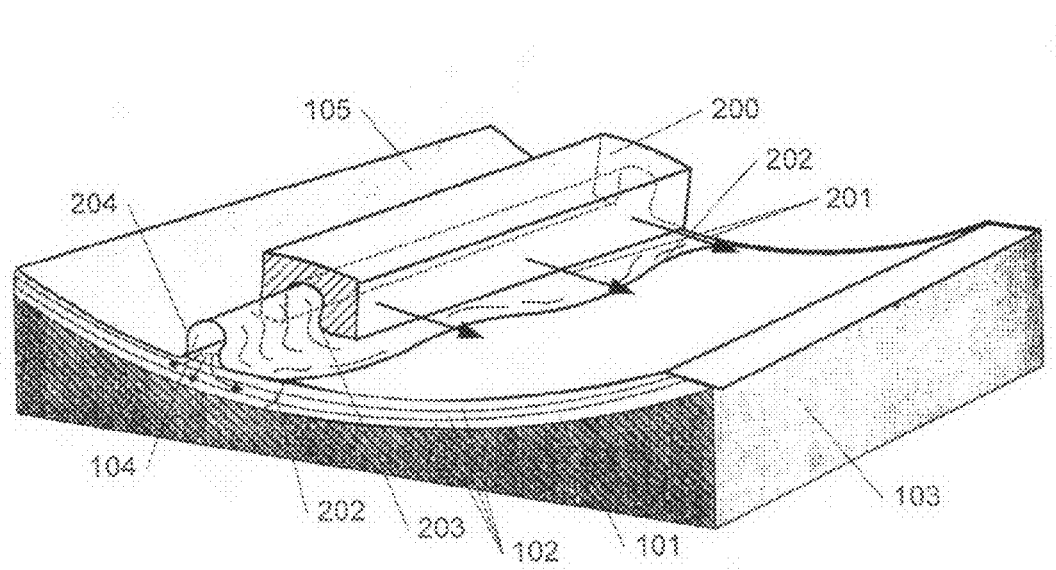
FIG. 2 shows the manufacture of a laminate by use of a movable suction unit according to the invention.

According to the present invention, the injection passages are made movable by using movable suction units or external inlet profiles 200 that are arranged on top of the vacuum foil 105 as illustrated in FIG. 2. The underside of the suction unit is upwardly curved 203 (see also subsequent figures) and the suction unit is coupled to a suction (not shown) to the effect that the vacuum foil 105 is sucked there into and forms a fold 204 or a bulge. In this manner the vacuum foil itself constitutes an injection passage 104 in which the resin can flow and inject layers 102 in the mould cavity. The resin can be supplied underneath the fold 204 on the vacuum foil 105 from one or more supply passages that may be situated e.g. along one or more edges of the mould 103. The magnitude of the suction on the suction unit may either be greater than the underpressure applied on the mould cavity, whereby the vacuum foil 105 will be pressed completely close to the underside 203 of the suction unit. Alternatively the suction on the suction unit may be of such magnitude that the underpressure in the mould cavity is completely or approximately equalized. In that case the vacuum foil could be lifted upwards into the suction unit by the resin when the latter is supplied. The suction can be applied to the suction units both before and after the formation of an underpressure in the mould cavity, which will, depending on the elasticity of the foil, cause the folds and hence of the inlet passages to be larger or smaller in cross section.

As outlined by arrows 201 in FIG. 2, the suction unit 200 enables moving or pushing of the fold 204 on the vacuum foil 105 and hence the injection passage 104 around across the surface of the laminate 101. Hereby the injection passage may e.g. be held close to the flow front 202 of the resin, whereby a large pressure gradient can be maintained with an ensuing quicker and more efficient injection. It is thus possible to move the resin injection to another area of the laminate and perform subsequent injection if, in that place, the impregnation was insufficient the first time around. Both during and after the injection, each individual injection passage 104 can be opened and closed an unlimited number of times and independently of the other injection passages, quite simply by regulating or optionally removing the suction from the associated suction unit 200. Hereby the underpressure in the mould cavity presses the vacuum foil together and downwards towards the mould, whereby the remaining resin from the inlet passage is pressed out and down into the laminate. The large amount of resin wasted when conventional stationary and more or less fixed inlet passages are used is also obviated by use of the inlet passages according to the invention.

A further advantage of the above-disclosed method resides in the inlet bags or tubes as such being omitted in the production which could otherwise, in the prior art, be used only once and then be discarded. Conversely the suction units according to the present invention can be reused for subsequent manufactures of laminates in an extent which is, in principle, unlimited. The suction units according to the invention are moreover not adapted specifically to the relevant mould part and shape of the laminate being produced, but rather it can be used in largely all moulds without needing adaptation. If the suction units are made of a flexible material, such as rubber of soft plastics, it may also follow even curved or double-curved surfaces. This also enables that the suction unit can be flexed while being moved forwards, which may be advantageous e.g. for moving around protruding parts on the laminates, inserts or the like.

According to a further embodiment of the invention, a vacuum passage is arranged and moved next to an injection passage during the resin injection into the laminate, whereby the pressure gradient and hence the rate of injection is further increased. The suction unit according to the invention can likewise be used to produce movable vacuum passages or areas by coupling the fold on the vacuum foil to a further suction.

Figure 3:
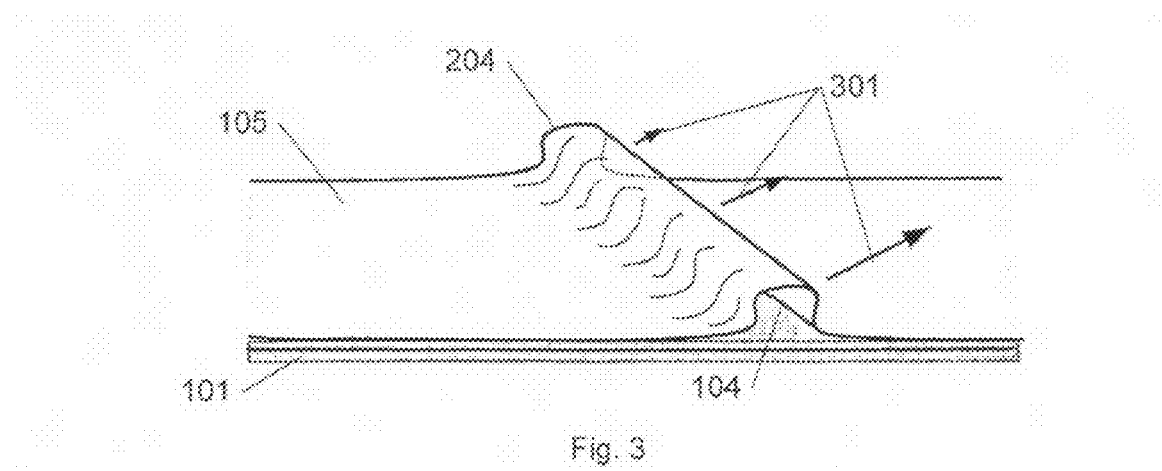
FIGS. 3-4 show various kinds of movable folds on a vacuum foil that form inlet passages.
Figure 4:
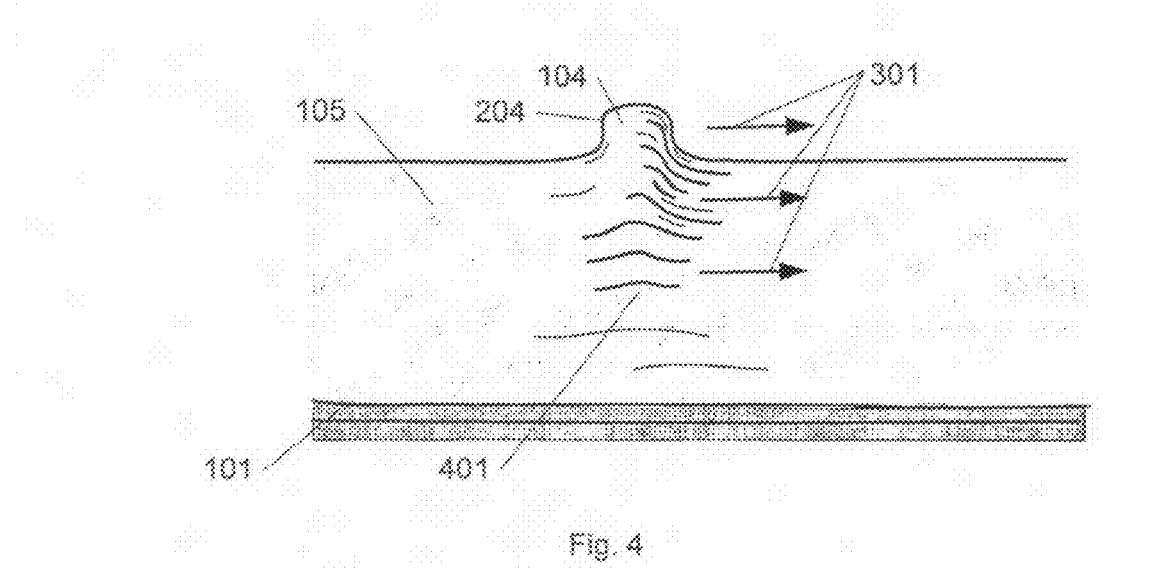

FIGS. 3 and 4 illustrate how a fold 204 on a vacuum cloth 105 which forms a movable inlet passage 104 can be moved or pushed across the surface of the laminate 101. The suction unit which lies across and lifts the vacuum foil is not shown for the sake of clarity. In FIG. 3 a fold 204 or bulge is outlined that extends transversally of the entire surface with a uniform cross section all the way. The arrows 301 illustrates how the fold 204 (by means of the suction unit) does not necessarily have to be pushed evenly throughout its entire length, but may very well be moved more at the one end than at the other.

The fold 204 illustrated in FIG. 4 does not extend all the way transversally of the laminate 101, rather it stops and evens out 401 somewhere at the middle. Correspondingly, the suction unit according to the invention need not reach all the way across the laminate, but may have smaller dimensions. Like the fold shown earlier, the fold 204 and injection passage 104 may also be moved about in any random way across the surface of the laminate 101. The only limitation to the pattern of movement of the suction unit is that the injection passage or area 104 formed by the fold in the foil underneath the suction unit must be connected to the resin supply. This may be accomplished e.g. by allowing the one end of the channel-shaped suction unit follow an edge of the mould part, where a tube with resin supply is laid underneath the vacuum foil. Another embodiment of this is shown later, in FIG. 9.

Figures 5, 6, 7:
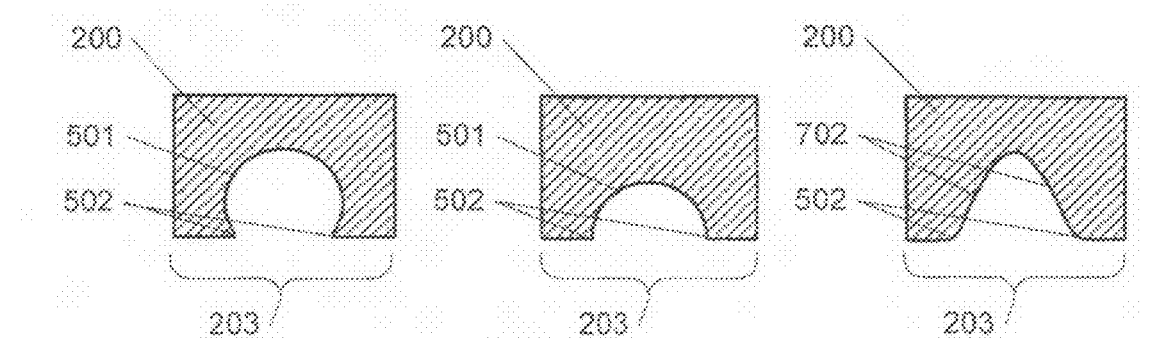
FIGS. 5-7 show different cross sections of a suction unit.

In FIGS. 5-7 various suitable configurations of a suction unit 200 are shown in cross section. The suction unit is constructed as an elongate passage with an upwardly arched or upwardly curved underside 203, into which the vacuum foil (not shown) is sucked. In FIGS. 5 and 6 the underside comprises circular sections 501 while, as shown in FIG. 7, it may also consist of straight lines 701 with rounded transitions 502. In order to be able to move the suction unit around while the vacuum foil is sucked there into, any corners and edges 502 on the underside 203 of the suction unit are rounded, whereby it is also avoided that the vacuum foil is damaged. The configuration of the sides and surface of the suction unit is of no consequence to the invention, but may, of course, be configured such that the suction unit becomes easy to handle and move.

Figure 8:
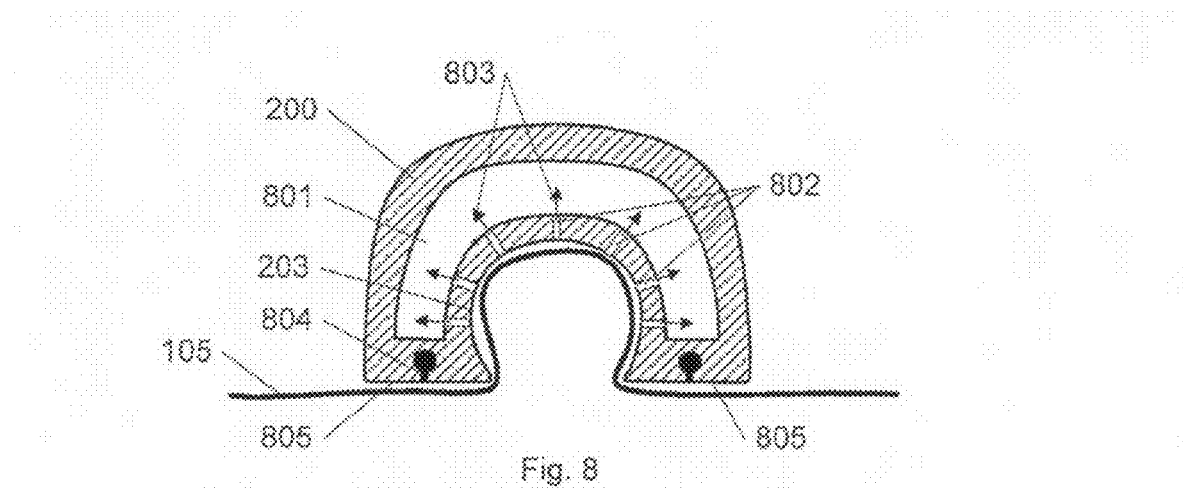
FIG. 8 shows a cross section of a suction unit in greater detail.

The suction on the suction unit is not shown in the figure, but may be connected to the cavity as such formed by the upwardly arched underside 203. According to a further embodiment, as illustrated in FIG. 8, underpressure is sucked in a cavity 801 in the suction unit as such, from where the underpressure is taken on to the entire or parts of the underside of the suction unit via a number of holes or perforations 802 as shown by arrows 803. The shown embodiment of the suction unit is further configured with two lubrication passages 804. From there a lubricant is supplied to the vacuum foil, whereby the suction unit can more easily be moved or pushed. As lubricant various oils, Vaseline or the like can be used. Here the lubricant passages 804 are arranged on the abutment faces 805 of the suction unit, but they may also be arranged elsewhere on the underside 203. The suction unit may be manufactured of various materials, such as metal, plastics or rubber. By manufacturing the suction unit from a flexible material, the advantageous aspect is accomplished that the suction unit is able to better follow the surface of the laminate with small or larger irregularities. Moreover, a flexible suction unit may also be used during the manufacture of laminates with curved or double-curved surface without particular adaptation of the unit.

Figure 9:
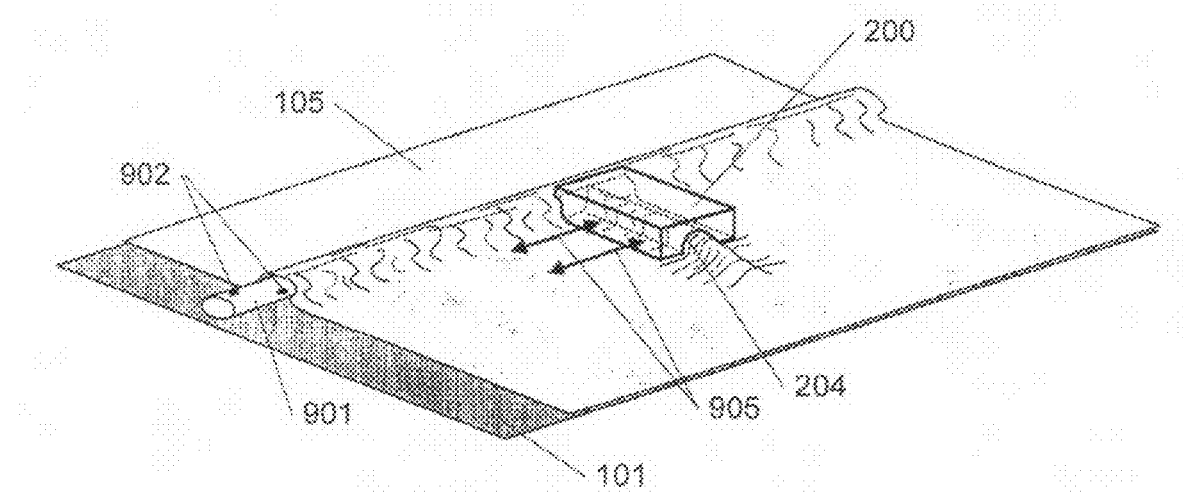
FIG. 9 shows a suction unit which is moved along a manifold with resin supply.

FIG. 9 shows the surface of a laminate 101 during resin injection with a suction unit 200 according to the invention arranged on top of the vacuum foil 105. In this embodiment the resin is supplied in a manifold 901 which is laid on top of the laminate underneath the vacuum foil. The manifold 901 is provided with holes 902 down along its length and primarily at its upper portion. Then the resin will flow out of these holes 902, but only to a very limited extent or not at all for as long as the vacuum foil 105 covers the holes 902. By taking the suction unit 200 with applied suction along the manifold 901 and, as outlined in the figure by arrows 905, the vacuum foil is lifted upwards from the manifold and the resin may flow out into the inlet passage formed by the fold 204 on the vacuum foil which is sucked into the suction unit. It is hereby possible to move a suction unit around and inject centrally on the laminate without having to reach and follow an edge of the mould part.

Figure 10:
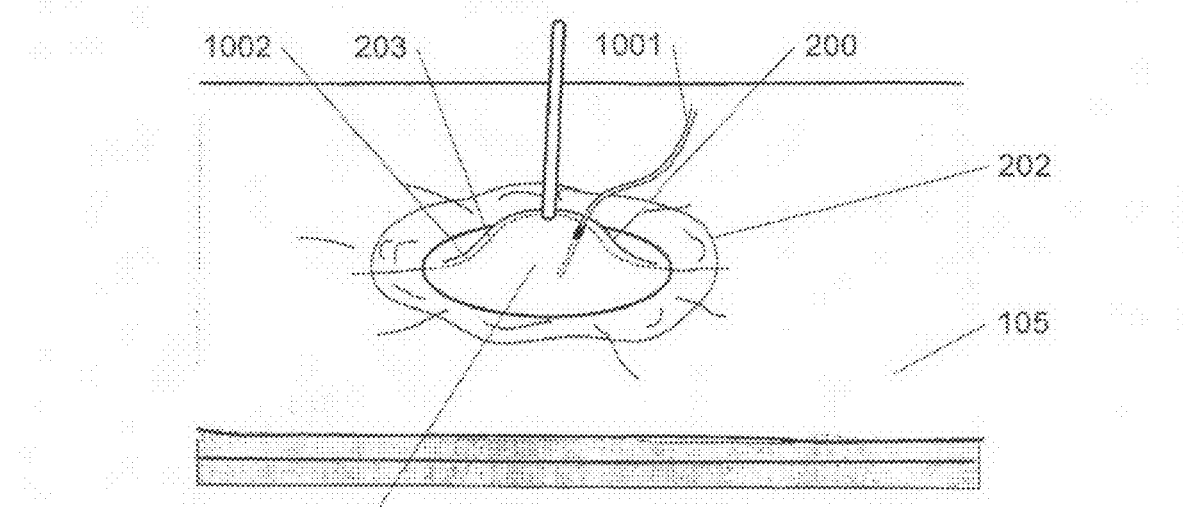
FIG. 10 shows a movable suction unit according to the invention with supply of resin through the suction unit.

According to yet further embodiments, the suction unit may be designed in other shapes than that of elongate passages. FIG. 10 shows a movable suction unit 200 according to the invention, where the underside 203 of the suction unit is configured as an inversed dish, and the vacuum foil thus bulges 1002 upwards into the suction unit 200 when an underpressure is formed between it and the foil. If the suction unit is not moved, the resin will flow approximately radially from the suction unit as shown by the outlined flow front 202. Here the resin may likewise be supplied to the injection area 104 underneath the vacuum foil 105 via a pipe or a tube 1001 conveyed through the suction unit 200 and through a hole in the vacuum foil 105 which is made temporarily underneath the suction unit. Following injection the hole can easily be patched again with e.g. tape. This suction unit is particularly advantageous for subsequent injection into areas where the resin injection was incomplete the first time around.

It will be understood that the invention as taught in the present specification and figures can be modified or changed while continuing to be comprised by the scope of protection conferred by the below claims.

The invention claimed is:

1. A device for formulating an injection area for resin during a manufacture of laminates, the device comprising:
a vacuum foil, a resin supply and a movable suction unit for being arranged on top of the vacuum foil to thereby form an elongated resin injection channel, the movable suction unit comprising:
an elongated body having opposing lengthwise ends and an underside extending therebetween;
opposing ends having a profile which forms an upwardly extending arch in the underside, thereby forming the elongated channel between the opposing ends with a substantially uniform cross section;
means for forming underpressure between the underside of the movable suction unit and the vacuum foil;
wherein the means for forming underpressure is capable of drawing the vacuum foil into the elongated channel so as to form an elongated passage with a substantially uniform cross section extending transversally in the vacuum foil for injecting resin while the movable suction unit moves over the vacuum foil during the manufacture;
wherein the device includes:
a resin supply passage situated along one or more edges of the foil; a resin supply manifold disposed underneath the vacuum foil; or a resin supply pipe or tube in communication with an outer surface of the movable suction unit for supplying resin to and through the movable suction unit and subsequently through at least one hole or perforation in the vacuum foil and onto a laminate.

2. A device for formulating an injection area for resin during a manufacture of laminates according to claim 1, characterised in that the means for forming underpressure are connected to at least one perforation in the upwardly arched underside.

3. A device for formulating an injection area for resin during a manufacture of laminates according to claim 1, characterised in that the movable suction unit further comprises at least one passage leading into at least a part of the abutting surface of the movable suction unit against the vacuum foil for supplying of lubricants to reduce the friction against the vacuum foil during moving.

4. A device for formulating an injection area for resin during a manufacture of laminates according to claim 1, characterised in that the movable suction unit further comprises at least one passage leading into the upwardly arched underside for supply of resin to the laminate through at least one hole or perforation in the vacuum foil.

5. A device for formulating an injection area for resin during a manufacture of laminates according to claim 1, characterised in the movable suction unit being manufactured at least partially of a flexible material, such as a soft plastic, rubber or the like.

* * * * *